United States Patent [19]

Pickup et al.

[11] Patent Number: 4,582,716

[45] Date of Patent: Apr. 15, 1986

[54] METHOD FOR FIXING ACETALDEHYDE

[75] Inventors: John G. Pickup, Peekskill; Fouad Z. Saleeb, Plesantville, both of N.Y.

[73] Assignee: General Foods Corporation, White Plains, N.Y.

[21] Appl. No.: 592,049

[22] Filed: Mar. 19, 1984

[51] Int. Cl.$^3$ .............................................. A23L 1/22
[52] U.S. Cl. ..................................... 426/650; 426/651; 426/96
[58] Field of Search .......................... 426/650, 651, 96

[56] References Cited

U.S. PATENT DOCUMENTS

| | | | |
|---|---|---|---|
| 3,314,803 | 4/1967 | Dame et al. | 426/650 X |
| 3,554,768 | 1/1971 | Feldman | 426/650 X |
| 3,625,709 | 12/1971 | Mitchell | 426/650 X |
| 3,971,852 | 7/1976 | Brenner et al. | 426/650 X |
| 4,271,202 | 6/1981 | Giel | 426/650 X |
| 4,276,312 | 6/1981 | Merritt | 426/650 X |
| 4,348,416 | 9/1982 | Boden | 426/96 X |

*Primary Examiner*—Joseph Golian
*Attorney, Agent, or Firm*—Barbara Toop D'Avanzo; Thomas R. Savoie; Daniel J. Donovan

[57] ABSTRACT

The present invention provides a methodology for fixing a volatile flavorant like acetaldehyde in a substrate composed of from 65 to 90% mannitol and from 10 to 35% of carbohydrate material composed of saccharides which are disaccharides or greater and combinations thereof. An aqueous solution is formed, said solution before composed of a mannitol component and a saccharide component and acetaldehyde is added thereto. The solution is spray-dried in a unit which has an inlet air temperature maintained at 105° C. to 135° C. and an outlet air temperature of from 60° C. to 90° C.

9 Claims, No Drawings

METHOD FOR FIXING ACETALDEHYDE

BACKGROUND OF THE INVENTION

1. Technical Field

The present invention relates to a method for fixing acetaldehyde, and more particularly, to an improved method for fixing acetaldehyde in an essentially mannitol substrate.

An important problem associated with the processing and sale of beverage products is imparting a fresh taste impact to the consumer, upon the reconstitution of the product. Such volatile components as aldehydes like acetaldehyde are important flavor components of fruits, vegetables and the like. Moreover, it has been found that interposing acetaldehyde in dry comestible mixes imparts an impact of freshness and enhancement in flavor particularly in fruit-flavor products. Therefore, there have been many attempts to fix acetaldehyde for its inclusion in dry comestible mixes. The problems attendant thereto are several-fold. The fixed product may be unstable, so that the acetaldehyde dissipates into the surrounding atmosphere or the fixative interacts with endogenous moisture. Moisture lability appears to be the most significant problem encountered with "fixed" acetaldehyde products. It has been demonstrated that moisture lability induces loss of the aldehyde due to the destruction of the fixative substrate.

2. Prior Art

There have been many attempts to fix aldehyde-generating volatile compounds in a variety of substrata. The most notable example is set out hereinbelow. The efficacy of such a fix is about 2% by weight. U.S. Pat. No. 3,314,803, issued to Dame et al. discloses a method for fixing acetaldehyde which includes first forming a solution of mannitol in water and preferably a supersaturated solution of mannitol, i.e., 25–45% mannitol solution. The super-saturated solution is formed by heating with agitation 2 to 10 parts by weight of mannitol with 10 parts by weight of water at 180°–212° F. until all of the mannitol is dissolved in water and no mannitol crystals remain in the solution. The mannitol solution is then cooled while acetaldehyde is added thereto, the acetaldehyde being continually refluxed and thereby condensed into mannitol solution until about 1 to 2 parts by weight of acetaldehyde are dissolved in a 10 parts by weight of water. The solution is then spray-dried with an initial acetaldehyde fix of approximately 4%–10% being obtained thereby. However, after one week exposure the level of acetaldehyde depleted to about 2.4% by weight of the total composition.

SUMMARY OF THE INVENTION

The present invention provides an improved methodology for fixing acetaldehyde in a substrate which is composed of 65–90% mannitol, and 10–35% of a carbohydrate impurity. The impurity may be composed of a saccharide material, with at least 95% by weight being equal to or greater than a disaccharide or any combinations thereof. To undertake the instant process, one first obtains an aqueous solution containing preferably 65–90% mannitol and 10–35% of the impurity (e.g. a disaccharide of a mixture of saccharides like a low D.E. maltodextrin the D.E. being from 4 D.E. to 20 D.E.). The solution is preferably supersaturated with respect to the mannitol, and is formed by heating with agitation 2 to 10 parts by weight of the substrate with 10 parts by weight of water at 20° to 80° C. until the substrate is dissolved in the water and none of the crystals of said substrate remain in solution. The substrate (e.g., mannitol-maltodextrin) solution is then cooled while acetaldehyde is added thereto, and mixed therethrough. A preferred range of mannitol-maltodextrin to acetaldehyde may range from two to eight parts by weight of mannitol-dextrin to one part by weight of acetaldehyde. The acetaldehyde-mannitol-maltodextrin solution may also be prepared by refluxing the components in a reflux tank and heating the solution to between 40° C. and 80° C. thereby forming a solution of the ingredients, said solution being supersaturate.

The final operative step is a spray-drying step. One atomizes the acetaldehyde-mannitol-maltodextrin solution into discrete droplets which are dried via a countercurrent blast of air. The air inlet temperature is maintained at between 105° and 135° C. while the air outlet temperature is maintained at between 60° and 90° C.

DETAILED DESCRIPTION OF THE INVENTION

Outlined hereinbelow is an improved methodology for fixing acetaldehyde in a mannitol-carbohydrate substrate. For purposes of the present invention the carbohydrate impurity shall be defined as being composed of a saccharide or mixture of saccharides wherein at least 95% of the saccharide units are equal to or greater than a disaccharide. For example, the hydrolysis product of a starch, that is a maltodextrin which by definition possesses a D.E. (dextrose equivalent) of less than 20 is a suitable material. A 10 D.E. malto-dextrin as manufactured by Amaizo Corp. possesses less than 2% monosaccharides, a 15 D.E. maltodextrin has less than 3% monosaccharides. The mannitol component is a crystalline material, derived from the hydrogenation of mannose. Therefore, the mannitol component of the present invention may contain, as a minor amount, less than 5% by weight mannose.

It appears that the malto-dextrin or saccharide impurity disrupts the essentially crystalline structure of the mannitol so that the substrate material is essentially amorphous. The disruption of the crystalline matrix and the resultant glass facilitates the fixation of acetaldehyde or other volatile flavorants, such as ethyl butyrate and diacetyl.

In order to practice the present invention the following stepwise procedure may be employed so that a moisture-stable product containing a high (in excess of 2.5% by weight, preferably above 3% by weight) "fix" of acetaldehyde is obtained. For illustrative purposes of the present invention, the sugar alcohol mannitol which comprises by weight, the major amount of the substrate (not less than 65%), shall be defined as mannitol 98% with formula weight 182.17, manufactured by Aldrich Chemical Co., Milwaukee, Wis. The acetaldehyde component shall be for purposes of the present invention, defined as having the formula $CH_3CHO$, formula weight 44.05, a product manufactured by Alrich Chemical Co., having a boiling point of 21° C.

The preferred carbohydrate impurity is a maltodextrin which is a material composed primarily of polysaccharides having a D.E. (dextrose equivalent) of less than 20 (an admixture of saccharides containing at most 2–3% monosaccharides). More preferably the maltodextrin should possess a dextrose equivalent of from 4 to 20 D.E.

Outlined in more detail hereinbelow is the preferred methodology for practicing the present invention.

A first portion of mannitol is mixed in an aqueous solution so that the mannitol component is from 65–90% (solids basis) of the substrate solution. To this solution 10–35% of a malto-dextrin (on a solids basis) is added thereto so that a supersaturate solution is formed concommitant to heating and agitation. The substrate solution most preferably contains about 75 parts mannitol and about 25 parts malto-dextrin. The malto-dextrin should preferably have a DE of between 4–20 and more preferably a DE of from 10–15. As stated hereinabove, a maltodextrin having a D.E. of from 10 to 15 is composed of not more than 3% monosaccharides. To the aqueous substrate solution 20.5% parts of acetaldehyde is added thereto and this solution, which is supersaturate in nature, is vigorously agitated so that the acetaldehyde component is evenly dispersed therethrough. The supersaturate solution is then dried. The drying methodology to be applied hereto is spray-drying, that is, to atomize a solution (i.e. mannitol-dextrin) into discrete droplets, said droplets being dried by a current of air forced through the spray dryer so that the mannitol-dextrin matrix encapsulates the volatile acetaldehyde. The term particle size is used herein to denote the average particle size, said particles constituting the significant weight fraction. The air temperatures of the spray drier Niro Atomizer, Coppenhagen, Denmark should be between 105° C. to 130° C. inlet and from 60° to 90° C. outlet. It should be noted that when spray drying acetaldehyde relatively mild drying temperatures must be employed in order to preserve this highly volatile aromatic component.

The spray dried mannitol-dextrin-acetaldehyde composition will have an initial fix of about 4 to 5% by weight acetaldehyde. This initial fix will remain stable at 3.3% acetaldehyde. As outlined herein below in Example 1, the fixed acetaldehyde is relatively stable for prolonged periods of time under adverse storage conditions, that is in an open beaker. Therefore, it can be seen that the new product is relatively non-hygroscopic and may tolerate levels of moisture not heretofore achieved.

The present invention will be described by reference to the following specific examples. The examples set out hereinbelow are merely for illustrative purposes so that different apparatus or methodologies concommitant with spray drying may be employed.

EXAMPLE 1

An aqueous solution of mannitol was prepared by dissolving 210 grams of mannitol in 900 ml. of water. Upon complete solubilization of the mannitol in hot water, 90 grams of LO-DEX, a 15 D.E. maltodextrin, was added and the solution was heated at approximately 95° C., until the solution turned clear (10 minutes). The solution which contains the mannitol-maltodextrin was then allowed to cool to about 30° C. The cool solution was maintained at about 26° C., to said solution 100 ml. of acetaldehyde was added thereto. The solution was transferred to a NIRO spray dryer, a countercurrent drying apparatus and the drying step was initiated. The spray dryer had an inlet air temperature of less than 155° C. with an outlet air temperature of about 77° C. The product obtained by the process outlined had an initial fix of 4.1% which was put into an open beaker wherein the fix remained at 3.3% after 9 days.

TABLE I

| FIXATION OF ACETALDEHYDE IN MANNITOL - LODEX MIXTURES | | | | | | |
|---|---|---|---|---|---|---|
| | I | II | III | IV | V | VI |
| LODEX LEVEL (Wgt) | 12% | 25% | 30% | 35% | 50% | 60% |
| MANNITOL LEVEL (Wgt) | 88% | 75% | 70% | 65% | 50% | 40% |
| INITIAL ACETALDEHYDE FIX (%) Wgt | 3.8% | 5.1% | 3.7% | 4.2% | STICKY | STICKY |
| FIX AFTER DURATION | 3.3 | 4.7 | 2.9 | 2.7 | — | — |
| (OPEN, AMBIENT) | (4 DAYS) | (3 DAYS) | (4 DAYS) | (4 DAYS) | — | — |
| DEXTROSE EQUIVALENT of Lodex | 10 | 10 | 15 | 15 | 5 | 10 |
| LODEX (g) | 36 | 125 | 90 | 105 | 300 | 360 |
| MANNITOL (g) | 264 | 375 | 210 | 195 | 300 | 240 |
| H2O (ml) | 1000 | 1416 | 900 | 800 | 1300 | 1300 |
| CH3CHO (ml) | 100 | 150 | 100 | 100 | 60 | 60 |

EXAMPLE 2

Table I summarizes the fixation of acetaldehyde in various compositions of mannitol-maltodextrin mixtures (mannitol levels from 40–88% by weight). The table clearly shows that if the mannitol composition is below about 65% (maltodextrin impurity exceeds 35%) a sticky (non-free flowing) product is obtained after spray drying the mannitol-maltodextrin-acetaldehyde aqueous mixtures.

EXAMPLE 3

Table II provides a composition between the improved performance of the instant invention and those of prior art (U.S. Pat. No. 3,314,803). Experiment 1 in Table II is a commercial mannitol fixed acetaldehyde manufactured by Fries and Fries (Division of MallinKrodt, Inc., Cincinnati, Ohio). The sample was received within 2 days of manufacture. Experiment 2 is a lab-scale run of the 100% mannitol fixation system. Experiments 3 and 4 represent the improvement of the current invention. Table II clearly shows higher fixation and retention of acetaldehyde for the mannitol-impurity systems.

TABLE II

| TYPE | INITIAL FIX (Wt %) | DAYS AMBIENT | END FIX (Wt %) |
|---|---|---|---|
| 1. Commercial Mannitol Fixed acetaldehyde (100% Mannitol manufactured by Fries and Fries) | 2.2 | 7 | 2.1 |
| 2. Mannitol fixed acetaldehyde (100% Mannitol) | 2.9 | 4 | 2.1 |
| 3. Mannitol-dextrin 75%–25% | 4.1 | 9 | 3.3 |
| 4. Mannitol-sucrose 75%–25% | 3.9 | 12 | 3.3 |

EXAMPLE 4

36 g of LO-DEX 10 and 264 g of mannitol were dissolved in 1000 ml water. The mixture was heated to 90° C. to accelerate the rate of dissolution. The clear solution was then cooled to 31° C. and 1000 ml acetaldehyde was added thereto followed by spray-drying (Niro, inlet 123° C., outlet 60°-78° C.). A free-flowing powder was obtained with an initial acetaldehyde level of 3.8%. A sample was exposed for 4 days (open beaker at ambient temperatures and humidities), the acetaldehyde fix content was 3.34%. There was no observable signs of caking and the powder was free-flowing. After 54 days in an open beaker (at ambient) the acetaldehyde content remained 3.2%.

EXAMPLE 5

264 g of mannitol and 36 g of maltose (monohydrate) were dissolved in 1000 ml water. The mixture was heated to 90° C. to accelerate the rate of dissolution. The clear solution was then cooled to 31° C. and 100 ml acetaldehyde was added thereto followed by spray-drying (Niro, inlet 120°-123° C., outlet 75° C.). A free-flowing powder was obtained with an initial acetaldehyde level of 3.5%. A sample was exposed for 4 days (open beaker at ambient temperatures and humidities), the acetaldehyde fix content was 3.0%. There was no observable signs of caking and the powder was free-flowing. After 56 days (open beaker) the fix stabilized at 2.8%.

EXAMPLE 6

Table III summarizes the acetaldehyde fixation results in mannitol-sucrose mixtures. In all cases, the mannitol was dissolved in water first by heating to about 95° C. to accelerate the rate of dissolution of mannitol. When a clear solution was obtained the preweighed sucrose was added. The solutions were then cooled to approximately 16° C. and 100 ml (79 g) acetaldehyde portions were added to each mixture. The solutions were spray-dried in the Niro spray dryer (inlet temperature 110° C., outlet temperature 75° C.). The initial fixation levels of acetaldehyde and its retention as function of time are given in Table III.

It is evident from Table III that a high acetaldehyde fix can be obtained in mannitol-sucrose mixtures. The best stabilities were found with mixture containing more than 8% sucrose.

As one can see by the examples furnished herein, a combination composed of mannitol and saccharides provides a fixation medium which is both stable and, non-hygroscopic. Other sugar alcohols like xylitol and sorbitol may not be operatively substituted for mannitol in the above defined methodology.

Mannitol is a highly crystalline compound, therefore it is unexpected that mannitol provides a superior fixation media when combined with a saccharide to form a glass.

The mannitol-saccharide substrate displays resistance to moisture and the ability to retain a significant fix of acetaldehyde for prolonged periods under ambient conditions. The foregoing has been a description with reference to the specific examples, although it is understood that other embodiments fall within the spirit and scope of the appended claims.

What is claimed is:

1. A method for producing a moisture-stable, fixed acetaldehyde composition having an amorphous substrate, which comprises the steps of:
   (a) forming an aqueous solution consisting of, on a solids basis, from 65 to 90% by weight mannitol and from 10 to 35% by weight of a carbohydrate consisting of a saccharide or mixture of saccharides, wherein at least 95% of the saccharides are equal to or greater than a disaccharide;
   (b) admixing acetaldehyde with the solution of step (a) and thereafter;
   (c) spray-drying the aqueous solution wherein the inlet air temperature is from 105° C. to 135° C. and the outlet air temperature is from 60° C. to 90° C.

2. The method of claim 1 wherein the carbohydrate is a maltodextrin or a disaccharide.

3. The method of claim 1 wherein the solution is supersaturated with respect to the mannitol.

4. The method of claim 1 wherein the carbohydrate is a maltodextrin.

5. The method of claim 1 wherein the solution contained 2–8 parts by weight of mannitol-carbohydrate per part acetaldehyde.

6. The method of claim 4 wherein the maltodextrin is of a DE of from 4 to 20.

7. The method according to claim 4 wherein the maltodextrin is of from 10 to 15 DE.

8. The method of claim 7 wherein the solution is supersaturated with respect to mannitol.

9. The method of claim 1 wherein the carbohydrate is a disaccharide.

* * * * *

TABLE III

| | Fixation of Acetaldehyde in Mannitol-Sucrose Mixtures Via Spray Drying | | | | | | |
|---|---|---|---|---|---|---|---|
| | | | | | Acetaldehyde Fix | | |
| Sample # | Mannitol Used (g) | Sucrose Used (g) | Sucrose (%) | Water Used (g) | Initial | 7 Days Open | 17 days Closed Jar |
| A | 276 | 24 | 8% | 1000 | 4.2% | 3.6% | 2.4% |
| B | 264 | 36 | 12% | 1000 | 3.6% | 3.4% | 3.5% |
| C | 252 | 48 | 16% | 1000 | 3.6% | 3.4% | 3.6% |
| D | 225 | 75 | 25% | 1000 | 3.9% | 3.3% (12 days) | 3.4% (24 days) |